(12) United States Patent
Maier

(10) Patent No.: US 8,061,972 B2
(45) Date of Patent: Nov. 22, 2011

(54) HIGH PRESSURE CASING ACCESS COVER

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 490 days.

(21) Appl. No.: 12/409,741

(22) Filed: Mar. 24, 2009

(65) Prior Publication Data
US 2010/0247299 A1    Sep. 30, 2010

(51) Int. Cl.
*F01B 25/20* (2006.01)
(52) U.S. Cl. .................................. 415/118; 415/201
(58) Field of Classification Search .................. 415/118, 415/201
See application file for complete search history.

(56) References Cited

U.S. PATENT DOCUMENTS

| 815,812 | A | 3/1906 | Gow |
|---|---|---|---|
| 1,057,613 | A | 4/1913 | Baldwin |
| 1,061,656 | A | 5/1913 | Black |
| 1,480,775 | A | 1/1924 | Marien |
| 1,622,768 | A | 3/1927 | Cook et al. |
| 1,642,454 | A | 9/1927 | Malmstrom |
| 2,006,244 | A | 6/1935 | Kopsa |
| 2,300,766 | A | 11/1942 | Baumann |
| 2,328,031 | A | 8/1943 | Risley |
| 2,345,437 | A | 3/1944 | Tinker |
| 2,602,462 | A | 7/1952 | Barrett |
| 2,811,303 | A | 10/1957 | Ault et al. |
| 2,836,117 | A | 5/1958 | Lankford |
| 2,868,565 | A | 1/1959 | Suderow |
| 2,897,917 | A | 8/1959 | Hunter |
| 2,932,360 | A | 4/1960 | Hungate |
| 2,954,841 | A | 10/1960 | Reistle |
| 2,965,286 | A | * | 12/1960 | Ledwith et al. ............... 415/190 |
| 3,044,657 | A | 7/1962 | Horton |
| 3,191,364 | A | 6/1965 | Sylvan |
| 3,198,214 | A | 8/1965 | Lorenz |

(Continued)

FOREIGN PATENT DOCUMENTS

CA    2647511    10/2007

(Continued)

OTHER PUBLICATIONS

PCT/US2010/025650 Notification of Transmittal of the International Search Report and the Written Opinion of the International Searching Authority, or the Declaration dated Apr. 22, 2010.

(Continued)

*Primary Examiner* — Igor Kershteyn
(74) *Attorney, Agent, or Firm* — Edmonds & Nolte, PC

(57) ABSTRACT

A closure device for a compressor having at least one access opening, wherein the closure device includes a plug portion disposeable at least partially within and configured to substantially obstruct the at least one access opening, a head portion having a shoulder surface extending generally radially outwardly with respect to the plug portion, wherein the head portion is generally disposeable against an inner surface of the compressor and configured to maintain the plug portion disposed within the at least one access opening during compressor operation, and a retainer member having a bracket engageable with an outer surface of the compressor and a threaded rod extending between the bracket and the plug portion, wherein the retainer member is configured to retain the plug portion disposed within the at least one access opening.

5 Claims, 4 Drawing Sheets

U.S. PATENT DOCUMENTS

| | | | |
|---|---|---|---|
| 3,204,696 A | 9/1965 | De Priester et al. | |
| 3,213,794 A | 10/1965 | Adams | |
| 3,220,245 A | 11/1965 | Van Winkle | |
| 3,273,325 A | 9/1966 | Gerhold | |
| 3,352,577 A | 11/1967 | Medney | |
| 3,362,160 A * | 1/1968 | Bourgeois | 60/805 |
| 3,395,511 A | 8/1968 | Akerman | |
| 3,402,434 A | 9/1968 | Kajimura | |
| 3,431,747 A | 3/1969 | Hasheimi et al. | |
| 3,454,163 A | 7/1969 | Read | |
| 3,487,432 A | 12/1969 | Jenson | |
| 3,490,209 A | 1/1970 | Fernandes et al. | |
| 3,500,614 A | 3/1970 | Soo | |
| 3,578,342 A | 5/1971 | Satterthwaite et al. | |
| 3,628,812 A | 12/1971 | Larraide et al. | |
| 3,672,733 A | 6/1972 | Arsenius et al. | |
| 3,814,486 A | 6/1974 | Schurger | |
| 3,829,179 A | 8/1974 | Kurita et al. | |
| 3,915,673 A | 10/1975 | Tamai et al. | |
| 3,975,123 A | 8/1976 | Schibbye | |
| 4,033,647 A | 7/1977 | Beavers | |
| 4,059,364 A | 11/1977 | Anderson et al. | |
| 4,078,809 A | 3/1978 | Garrick et al. | |
| 4,087,261 A | 5/1978 | Hays | |
| 4,103,899 A | 8/1978 | Turner | |
| 4,112,687 A | 9/1978 | Dixon | |
| 4,117,359 A | 9/1978 | Wehde | |
| 4,135,542 A | 1/1979 | Chisholm | |
| 4,141,283 A | 2/1979 | Swanson et al. | |
| 4,146,261 A | 3/1979 | Edmaier et al. | |
| 4,165,622 A | 8/1979 | Brown, Jr. | |
| 4,174,925 A | 11/1979 | Pfenning et al. | |
| 4,182,480 A | 1/1980 | Theyse et al. | |
| 4,197,990 A | 4/1980 | Carberg et al. | |
| 4,205,927 A | 6/1980 | Simmons | |
| 4,227,373 A | 10/1980 | Amend et al. | |
| 4,258,551 A | 3/1981 | Ritzi | |
| 4,259,045 A | 3/1981 | Teruyama | |
| 4,278,200 A | 7/1981 | Gunnewig | |
| 4,298,311 A | 11/1981 | Ritzi | |
| 4,333,748 A | 6/1982 | Erickson | |
| 4,334,592 A | 6/1982 | Fair | |
| 4,336,693 A | 6/1982 | Hays et al. | |
| 4,339,923 A | 7/1982 | Hays et al. | |
| 4,347,900 A | 9/1982 | Barrington | |
| 4,363,608 A | 12/1982 | Mulders | |
| 4,374,583 A | 2/1983 | Barrington | |
| 4,375,975 A | 3/1983 | McNicholas | |
| 4,382,804 A | 5/1983 | Mellor | |
| 4,384,724 A | 5/1983 | Derman et al. | |
| 4,391,102 A | 7/1983 | Studhalter et al. | |
| 4,396,361 A | 8/1983 | Fraser | |
| 4,432,470 A | 2/1984 | Sopha | |
| 4,438,638 A | 3/1984 | Hays et al. | |
| 4,441,322 A | 4/1984 | Ritzi | |
| 4,442,925 A | 4/1984 | Fukushima et al. | |
| 4,453,893 A | 6/1984 | Hutmaker | |
| 4,463,567 A | 8/1984 | Amend et al. | |
| 4,468,234 A | 8/1984 | McNicholas | |
| 4,471,795 A | 9/1984 | Linhardt | |
| 4,477,223 A | 10/1984 | Giroux | |
| 4,502,839 A | 3/1985 | Maddox et al. | |
| 4,511,309 A | 4/1985 | Maddox | |
| 4,531,888 A | 7/1985 | Buchelt | |
| 4,536,134 A | 8/1985 | Huiber | |
| 4,541,531 A | 9/1985 | Brule | |
| 4,541,607 A | 9/1985 | Hotger | |
| 4,573,527 A | 3/1986 | McDonough | |
| 4,574,815 A | 3/1986 | West et al. | |
| 4,648,806 A | 3/1987 | Alexander | |
| 4,687,017 A | 8/1987 | Danko et al. | |
| 4,737,081 A | 4/1988 | Nakajima et al. | |
| 4,752,185 A | 6/1988 | Butler et al. | |
| 4,807,664 A | 2/1989 | Wilson et al. | |
| 4,813,495 A | 3/1989 | Leach | |
| 4,821,737 A | 4/1989 | Nelson | |
| 4,826,403 A | 5/1989 | Catlow | |
| 4,830,331 A | 5/1989 | Vindum | |
| 4,832,709 A | 5/1989 | Nagyszalanczy | |
| 4,904,284 A | 2/1990 | Hanabusa | |
| 4,955,787 A * | 9/1990 | Veronesi | 415/118 |
| 4,984,830 A | 1/1991 | Saunders | |
| 5,007,328 A | 4/1991 | Otterman | |
| 5,024,585 A | 6/1991 | Kralovec | |
| 5,043,617 A | 8/1991 | Rostron | |
| 5,044,701 A | 9/1991 | Watanabe et al. | |
| 5,045,046 A | 9/1991 | Bond | |
| 5,054,995 A | 10/1991 | Kaseley et al. | |
| 5,064,452 A | 11/1991 | Yano et al. | |
| 5,080,137 A | 1/1992 | Adams | |
| 5,190,440 A | 3/1993 | Maier et al. | |
| 5,202,024 A | 4/1993 | Andersson et al. | |
| 5,202,026 A | 4/1993 | Lema | |
| 5,203,891 A | 4/1993 | Lema | |
| 5,207,810 A | 5/1993 | Sheth | |
| 5,211,427 A | 5/1993 | Washizu | |
| 5,246,346 A | 9/1993 | Schiesser | |
| 5,285,123 A | 2/1994 | Kataoka et al. | |
| 5,306,051 A | 4/1994 | Loker et al. | |
| 5,337,779 A | 8/1994 | Fukuhara | |
| 5,378,121 A | 1/1995 | Hackett | |
| 5,385,446 A | 1/1995 | Hays | |
| 5,421,708 A | 6/1995 | Utter | |
| 5,431,534 A * | 7/1995 | Charbonnel | 415/118 |
| 5,443,581 A | 8/1995 | Malone | |
| 5,484,521 A | 1/1996 | Kramer | |
| 5,496,394 A | 3/1996 | Nied | |
| 5,500,039 A | 3/1996 | Mori et al. | |
| 5,525,034 A | 6/1996 | Hays | |
| 5,525,146 A | 6/1996 | Straub | |
| 5,531,811 A | 7/1996 | Kloberdanz | |
| 5,538,259 A | 7/1996 | Uhrner et al. | |
| 5,542,831 A | 8/1996 | Scarfone | |
| 5,545,010 A * | 8/1996 | Cederwall et al. | 416/145 |
| 5,575,309 A | 11/1996 | Connell | |
| 5,585,000 A | 12/1996 | Sassi | |
| 5,605,172 A | 2/1997 | Schubert et al. | |
| 5,628,623 A | 5/1997 | Skaggs | |
| 5,634,492 A | 6/1997 | Steinruck et al. | |
| 5,640,472 A | 6/1997 | Meinzer et al. | |
| 5,641,280 A | 6/1997 | Timuska | |
| 5,653,347 A | 8/1997 | Larsson | |
| 5,664,420 A | 9/1997 | Hays | |
| 5,682,759 A | 11/1997 | Hays | |
| 5,683,235 A | 11/1997 | Welch | |
| 5,685,691 A | 11/1997 | Hays | |
| 5,687,249 A | 11/1997 | Kato | |
| 5,693,125 A | 12/1997 | Dean | |
| 5,703,424 A | 12/1997 | Dorman | |
| 5,709,528 A | 1/1998 | Hablanian | |
| 5,713,720 A | 2/1998 | Barhoum | |
| 5,720,799 A | 2/1998 | Hays | |
| 5,750,040 A | 5/1998 | Hays | |
| 5,775,882 A | 7/1998 | Kiyokawa et al. | |
| 5,779,619 A | 7/1998 | Borgstrom et al. | |
| 5,795,135 A | 8/1998 | Nyilas et al. | |
| 5,800,092 A | 9/1998 | Nill et al. | |
| 5,848,616 A | 12/1998 | Vogel et al. | |
| 5,850,857 A | 12/1998 | Simpson | |
| 5,853,585 A | 12/1998 | Nesseth | |
| 5,863,023 A | 1/1999 | Evans et al. | |
| 5,867,976 A * | 2/1999 | Ziegler, Jr. | 60/803 |
| 5,899,435 A | 5/1999 | Mitsch et al. | |
| 5,935,053 A | 8/1999 | Strid | |
| 5,938,803 A | 8/1999 | Dries | |
| 5,938,819 A | 8/1999 | Seery | |
| 5,946,915 A | 9/1999 | Hays | |
| 5,951,066 A | 9/1999 | Lane et al. | |
| 5,965,022 A | 10/1999 | Gould | |
| 5,967,746 A | 10/1999 | Hagi et al. | |
| 5,971,702 A | 10/1999 | Afton et al. | |
| 5,971,907 A | 10/1999 | Johannemann et al. | |
| 5,980,218 A | 11/1999 | Takahashi et al. | |
| 5,988,524 A | 11/1999 | Odajima et al. | |
| 6,035,934 A | 3/2000 | Stevenson et al. | |
| 6,059,539 A | 5/2000 | Nyilas et al. | |
| 6,068,447 A | 5/2000 | Foege | |

| | | | | | | |
|---|---|---|---|---|---|---|
| 6,090,174 | A | 7/2000 | Douma et al. | 7,258,713 B2 | 8/2007 | Eubank et al. |
| 6,090,299 | A | 7/2000 | Hays et al. | 7,270,145 B2 | 9/2007 | Koezler |
| 6,113,675 | A | 9/2000 | Branstetter | 7,288,202 B2 | 10/2007 | Maier |
| 6,122,915 | A | 9/2000 | Hays | 7,314,560 B2 | 1/2008 | Yoshida et al. |
| 6,123,363 | A | 9/2000 | Burgard et al. | 7,323,023 B2 | 1/2008 | Michele et al. |
| 6,145,844 | A | 11/2000 | Waggott | 7,328,749 B2 | 2/2008 | Reitz |
| 6,149,825 | A | 11/2000 | Gargas | 7,335,313 B2 | 2/2008 | Moya |
| 6,151,881 | A | 11/2000 | Ai et al. | 7,377,110 B2 | 5/2008 | Sheridan et al. |
| 6,196,962 | B1 | 3/2001 | Purvey et al. | 7,381,235 B2 | 6/2008 | Koene et al. |
| 6,206,202 | B1 | 3/2001 | Galk et al. | 7,396,373 B2 | 7/2008 | Lagerstedt et al. |
| 6,214,075 | B1 | 4/2001 | Filges et al. | 7,399,412 B2 | 7/2008 | Keuschnigg |
| 6,217,637 | B1 | 4/2001 | Toney et al. | 7,435,290 B2 | 10/2008 | Lane et al. |
| 6,227,379 | B1 | 5/2001 | Nesseth | 7,445,653 B2 | 11/2008 | Trautmann et al. |
| 6,277,278 | B1 | 8/2001 | Conrad et al. | 7,470,299 B2 | 12/2008 | Han et al. |
| 6,312,021 | B1 | 11/2001 | Thomas | 7,473,083 B2 | 1/2009 | Oh et al. |
| 6,314,738 | B1 | 11/2001 | Hays | 7,479,171 B2 | 1/2009 | Cho et al. |
| 6,372,006 | B1 | 4/2002 | Pregenzer et al. | 7,494,523 B2 | 2/2009 | Oh et al. |
| 6,375,437 | B1 | 4/2002 | Nolan | 7,501,002 B2 | 3/2009 | Han et al. |
| 6,383,262 | B1 | 5/2002 | Marthinsen et al. | 7,520,210 B2 | 4/2009 | Theodore, Jr. et al. |
| 6,394,764 | B1 | 5/2002 | Samurin | 7,575,422 B2 | 8/2009 | Bode et al. |
| 6,398,973 | B1 | 6/2002 | Saunders et al. | 7,578,863 B2 | 8/2009 | Becker et al. |
| 6,402,465 | B1 | 6/2002 | Maier | 7,591,882 B2 | 9/2009 | Harazim |
| 6,426,010 | B1 | 7/2002 | Lecoffre et al. | 7,594,941 B2 | 9/2009 | Zheng et al. |
| 6,464,469 | B1 | 10/2002 | Grob et al. | 7,594,942 B2 | 9/2009 | Polderman |
| 6,467,988 | B1 | 10/2002 | Czachor et al. | 7,610,955 B2 | 11/2009 | Irwin, Jr. |
| 6,468,426 | B1 | 10/2002 | Klass | 7,628,836 B2 | 12/2009 | Baronet et al. |
| 6,485,536 | B1 | 11/2002 | Masters | 7,637,699 B2 | 12/2009 | Albrecht |
| 6,530,484 | B1 | 3/2003 | Bosman | 7,674,377 B2 | 3/2010 | Crew |
| 6,530,979 | B2 | 3/2003 | Firey | 7,677,308 B2 | 3/2010 | Kolle |
| 6,531,066 | B1 | 3/2003 | Saunders et al. | 7,708,537 B2 | 5/2010 | Bhatia et al. |
| 6,537,035 | B2 | 3/2003 | Shumway | 7,708,808 B1 | 5/2010 | Heumann |
| 6,540,917 | B1 | 4/2003 | Rachels et al. | 7,744,663 B2 | 6/2010 | Wallace |
| 6,547,037 | B2 | 4/2003 | Kuzdzal | 7,748,079 B2 | 7/2010 | McDowell et al. |
| 6,592,654 | B2 | 7/2003 | Brown | 7,766,989 B2 | 8/2010 | Lane et al. |
| 6,596,046 | B2 | 7/2003 | Conrad et al. | 7,811,344 B1 | 10/2010 | Duke et al. |
| 6,599,086 | B2 | 7/2003 | Soja | 7,811,347 B2 | 10/2010 | Carlsson et al. |
| 6,607,348 | B2 | 8/2003 | Jean | 7,815,415 B2 | 10/2010 | Kanezawa et al. |
| 6,616,719 | B1 | 9/2003 | Sun et al. | 7,824,458 B2 | 11/2010 | Borgstrom et al. |
| 6,617,731 | B1 | 9/2003 | Goodnick | 7,824,459 B2 | 11/2010 | Borgstrom et al. |
| 6,629,825 | B2 | 10/2003 | Stickland et al. | 7,846,228 B1 | 12/2010 | Saaski et al. |
| 6,631,617 | B1 | 10/2003 | Dreiman et al. | 2001/0007283 A1 | 7/2001 | Johal et al. |
| 6,658,986 | B2 | 12/2003 | Pitla et al. | 2002/0009361 A1 | 1/2002 | Reichert et al. |
| 6,659,143 | B1 | 12/2003 | Taylor et al. | 2003/0029318 A1 | 2/2003 | Firey |
| 6,669,845 | B2 | 12/2003 | Klass | 2003/0035718 A1 | 2/2003 | Langston et al. |
| 6,688,802 | B2 | 2/2004 | Ross et al. | 2003/0136094 A1 | 7/2003 | Illingworth et al. |
| 6,707,200 | B2 | 3/2004 | Carroll et al. | 2004/0007261 A1 | 1/2004 | Cornwell |
| 6,718,955 | B1 | 4/2004 | Knight | 2004/0170505 A1 | 9/2004 | Lenderink et al. |
| 6,719,830 | B2 | 4/2004 | Illingworth et al. | 2005/0173337 A1 | 8/2005 | Costinel |
| 6,764,284 | B2 | 7/2004 | Oehman, Jr. | 2006/0065609 A1 | 3/2006 | Arthur |
| 6,776,812 | B2 | 8/2004 | Komura et al. | 2006/0090430 A1 | 5/2006 | Trautman et al. |
| 6,802,693 | B2 | 10/2004 | Reinfeld et al. | 2006/0096933 A1 | 5/2006 | Maier |
| 6,802,881 | B2 | 10/2004 | Illingworth et al. | 2006/0157251 A1 | 7/2006 | Stinessen et al. |
| 6,811,713 | B2 | 11/2004 | Arnaud | 2006/0157406 A1 | 7/2006 | Maier |
| 6,817,846 | B2 | 11/2004 | Bennitt | 2006/0193728 A1 | 8/2006 | Lindsey et al. |
| 6,837,913 | B2 | 1/2005 | Schilling et al. | 2006/0222515 A1 | 10/2006 | Delmotte et al. |
| 6,843,836 | B2 | 1/2005 | Kitchener | 2006/0230933 A1 | 10/2006 | Harazim |
| 6,878,187 | B1 | 4/2005 | Hays et al. | 2006/0239831 A1 | 10/2006 | Garris, Jr. |
| 6,893,208 | B2 | 5/2005 | Frosini et al. | 2006/0254659 A1 | 11/2006 | Bellott et al. |
| 6,907,933 | B2 | 6/2005 | Choi et al. | 2006/0275160 A1 | 12/2006 | Leu et al. |
| 6,979,358 | B2 | 12/2005 | Ekker | 2007/0029091 A1 | 2/2007 | Stinessen et al. |
| 7,001,448 | B1 | 2/2006 | West | 2007/0036646 A1 | 2/2007 | Nguyen et al. |
| 7,013,978 | B2 | 3/2006 | Appleford et al. | 2007/0051245 A1 | 3/2007 | Yun |
| 7,022,150 | B2 | 4/2006 | Borgstrom et al. | 2007/0062374 A1 | 3/2007 | Kolle |
| 7,022,153 | B2 | 4/2006 | McKenzie | 2007/0065317 A1 | 3/2007 | Stock |
| 7,025,890 | B2 | 4/2006 | Moya | 2007/0084340 A1 | 4/2007 | Dou et al. |
| 7,033,410 | B2 | 4/2006 | Hilpert et al. | 2007/0140870 A1 | 6/2007 | Fukanuma et al. |
| 7,033,411 | B2 | 4/2006 | Carlsson et al. | 2007/0151922 A1 | 7/2007 | Mian |
| 7,056,363 | B2 | 6/2006 | Carlsson et al. | 2007/0163215 A1 | 7/2007 | Lagerstadt |
| 7,063,465 | B1 | 6/2006 | Wilkes et al. | 2007/0172363 A1 | 7/2007 | Laboube et al. |
| 7,112,036 | B2 | 9/2006 | Lubell et al. | 2007/0196215 A1 | 8/2007 | Frosini et al. |
| 7,131,292 | B2 | 11/2006 | Ikegami et al. | 2007/0227969 A1 | 10/2007 | Dehaene et al. |
| 7,144,226 | B2 | 12/2006 | Pugnet et al. | 2007/0294986 A1 | 12/2007 | Beetz |
| 7,159,723 | B2 | 1/2007 | Hilpert et al. | 2008/0031732 A1 | 2/2008 | Peer et al. |
| 7,160,518 | B2 | 1/2007 | Chen et al. | 2008/0039732 A9 | 2/2008 | Bowman |
| 7,169,305 | B2 | 1/2007 | Gomez | 2008/0246281 A1 | 10/2008 | Agrawal et al. |
| 7,185,447 | B2 | 3/2007 | Arbeiter | 2008/0315812 A1 | 12/2008 | Balboul |
| 7,204,241 | B2 | 4/2007 | Thompson | 2009/0013658 A1 | 1/2009 | Borgstrom et al. |
| 7,241,392 | B2 | 7/2007 | Maier | 2009/0015012 A1 | 1/2009 | Metzler et al. |
| 7,244,111 | B2 | 7/2007 | Suter et al. | 2009/0025562 A1 | 1/2009 | Hallgren et al. |

| | | | |
|---|---|---|---|
| 2009/0025563 | A1 | 1/2009 | Borgstrom et al. |
| 2009/0151928 | A1 | 6/2009 | Lawson |
| 2009/0159523 | A1 | 6/2009 | McCutchen |
| 2009/0169407 | A1 | 7/2009 | Yun |
| 2009/0173095 | A1 | 7/2009 | Bhatia et al. |
| 2009/0266231 | A1 | 10/2009 | Franzen et al. |
| 2009/0304496 | A1 | 12/2009 | Maier |
| 2009/0321343 | A1 | 12/2009 | Maier |
| 2009/0324391 | A1 | 12/2009 | Maier |
| 2010/0007133 | A1 | 1/2010 | Maier |
| 2010/0021292 | A1 | 1/2010 | Maier et al. |
| 2010/0038309 | A1 | 2/2010 | Maier |
| 2010/0043288 | A1 | 2/2010 | Wallace |
| 2010/0043364 | A1 | 2/2010 | Curien |
| 2010/0044966 | A1 | 2/2010 | Majot et al. |
| 2010/0072121 | A1 | 3/2010 | Maier |
| 2010/0074768 | A1 | 3/2010 | Maier |
| 2010/0083690 | A1 | 4/2010 | Sato et al. |
| 2010/0090087 | A1 | 4/2010 | Maier |
| 2010/0143172 | A1 | 6/2010 | Sato et al. |
| 2010/0163232 | A1 | 7/2010 | Koll |
| 2010/0183438 | A1 | 7/2010 | Maier et al. |
| 2010/0239419 | A1 | 9/2010 | Maier et al. |
| 2010/0239437 | A1 | 9/2010 | Maier |
| 2010/0247299 | A1 | 9/2010 | Maier |
| 2010/0257827 | A1 | 10/2010 | Lane et al. |
| 2011/0017307 | A1 | 1/2011 | Kidd et al. |
| 2011/0061536 | A1 | 3/2011 | Maier et al. |

FOREIGN PATENT DOCUMENTS

| | | |
|---|---|---|
| EP | 301285 | 10/1991 |
| EP | 1582703 | 10/2005 |
| EP | 2013479 | 1/2009 |
| EP | 7838631.5 | 12/2009 |
| GB | 2323639 | 9/1998 |
| GB | 2337561 | 11/1999 |
| JP | 54099206 | 1/1978 |
| JP | 08 068501 | 3/1996 |
| JP | 8-284961 A | 11/1996 |
| JP | 2002 242699 | 8/2002 |
| JP | 2004034017 A | 2/2004 |
| JP | 3711028 | 10/2005 |
| JP | 2005291202 | 10/2005 |
| KR | 2009085521 | 2/2008 |
| MX | 2008012579 | 12/2008 |
| WO | 9524563 | 9/1995 |
| WO | 0117096 | 3/2001 |
| WO | 2007043889 | 4/2007 |
| WO | 2007103248 | 9/2007 |
| WO | 2007120506 | 10/2007 |
| WO | 2008036221 | 3/2008 |
| WO | 2008039446 | 3/2008 |
| WO | 2008039491 | 4/2008 |
| WO | 2008039731 | 4/2008 |
| WO | 2008039732 | 4/2008 |
| WO | 2008039733 | 4/2008 |
| WO | 2008039734 | 4/2008 |
| WO | 20080039732 A2 | 4/2008 |
| WO | 2008036394 | 7/2008 |
| WO | 2009111616 | 9/2009 |
| WO | 2009158252 | 12/2009 |
| WO | 2009158253 | 12/2009 |
| WO | 2010083416 | 7/2010 |
| WO | 2010083427 | 7/2010 |
| WO | 2010107579 | 9/2010 |
| WO | 2010110992 | 9/2010 |
| WO | 2010110992 A2 | 9/2010 |
| WO | 2011034764 | 3/2011 |

OTHER PUBLICATIONS

PCT/US2010/025650 Notification of Transmittal of the International Preliminary Report on Patentability Mar. 14, 2011.
Technical Manual—High Pressure Air Compressor Model 13NL45; Navsea S6220-AT-MMA-010/93236, pp. 3-23 to 3-32, Electric Boat Corporation, Groton, CT 06340, Oct. 28, 1991.
PCT/US2007/008149 International Preliminary Report on Patentability dated Sep. 30, 2008.
PCT/US2007/008149 International Search Report and Written Opinion dated Jul. 17, 2008.
PCT/US2007/020101 International Preliminary Report on Patentability dated Apr. 2, 2009.
PCT/US2007/020101 International Search Report dated Apr. 29, 2008.
PCT/US2007/020101 Written Opinion dated Mar. 19, 2009.
PCT/US2007/020471 International Preliminary Report on Patentability dated Apr. 2, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 International Search Report dated Apr. 11, 2008.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 International Search Report dated Jul. 17, 2008.
PCT/US2007/079350 Written Opinion dated Mar. 25, 2009.
PCT/US2007/079352 International Preliminary Report on Patentability dated Mar. 31, 2009.
PCT/US2007/079352 International Search Report and Written Opinion dated Aug. 27, 2008.
PCT/US2009/036142 International Preliminary Report on Patentability dated Sep. 16, 2010.
PCT/US2009/036142 International Search Report dated Jan. 7, 2010.
PCT/US2009/036142 Written Opinion dated May 11, 2009.
PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.
PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.
PCT/US2010/025952 International Report on Patentability dated Mar. 14, 2011.
PCT/US2009/047667 International Report on Patentability dated Jan. 13, 2011.
PCT/US2009/047667 Written Opinion dated Aug. 7, 2009.
PCT/US2009/047667 International Search Report dated Dec. 30, 2009.
Dresser-Rand, Inc. "High Pressure Air Compressor Model 13NL45," Oct. 28, 1991, 14 pages.

* cited by examiner

HIGH PRESSURE CASING ACCESS COVER

BACKGROUND

The present disclosure relates to fluid machinery, and more particularly to high pressure casings for such machinery.

Fluid machinery such as centrifugal compressors each typically includes a casing for containing working components such as one or more impellers mounted on a rotatable shaft. The casing includes one or more inlets for directing fluid inwardly toward the compressor working components and one or more outlets for directing pressurized fluid outwardly from the casing for subsequent processing or ultimate usage. Further, such compressor casings often include one or more openings to provide access to maintain or repair components of the compressor, for example, shaft bearings, etc. Such access openings must be closed by a hatch or cover during normal compressor use.

Since a variety of compressors are operated at relatively high pressure, the access covers are required to resist this high pressure, and are therefore often relatively thick, require the machining of a protrusion for mounting the cover, and are typically secured by a relatively large number of fasteners or bolts. Since these compressors may operate in hostile environments such as sub-sea applications, the cover bolts could be subject to deterioration, which may lead to failure of the entire compressor.

SUMMARY

Embodiments of the disclosure may provide a closure device for a compressor having at least one access opening. The closure device may include a plug portion disposeable at least partially within and configured to substantially obstruct the at least one access opening, a head portion having a shoulder surface extending generally radially outwardly with respect to the plug portion, wherein the head portion is generally disposeable against an inner surface of the compressor and configured to maintain the plug portion disposed within the at least one access opening during compressor operation, and a retainer member having a bracket engageable with an outer surface of the compressor and a threaded rod extending between the bracket and the plug portion, wherein the retainer member is configured to retain the plug portion disposed within the at least one access opening.

Embodiments of the disclosure may further provide a compressor assembly. The compressor assembly may include a casing having an inner surface defining an interior chamber, an opposing outer surface, and at least one access opening extending between the casing inner and outer surfaces, and at least one closure device having a plug portion and a head portion, the plug portion being disposeable at least partially within and configured to substantially obstruct the at least one access opening, and the head portion having a shoulder surface extending generally radially outward with respect to the plug portion, the shoulder surface being generally biasable against the inner surface of the casing by pressure within the casing so as retain the plug portion disposed within the at least one access opening.

Embodiments of the disclosure may further provide a closure device for at least one access opening of a compressor casing. The closure device may include a plug portion disposeable at least partially within the at least one access opening, wherein the plug portion is configured to substantially obstruct the at least one access opening, and a shoulder portion extending generally radially outward from the plug portion, wherein the shoulder portion is generally disposeable against an inner surface of the compressor casing, such that pressure within the casing forces the shoulder portion into contact with the inner surface to retain the plug portion disposed within the at least one access opening.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
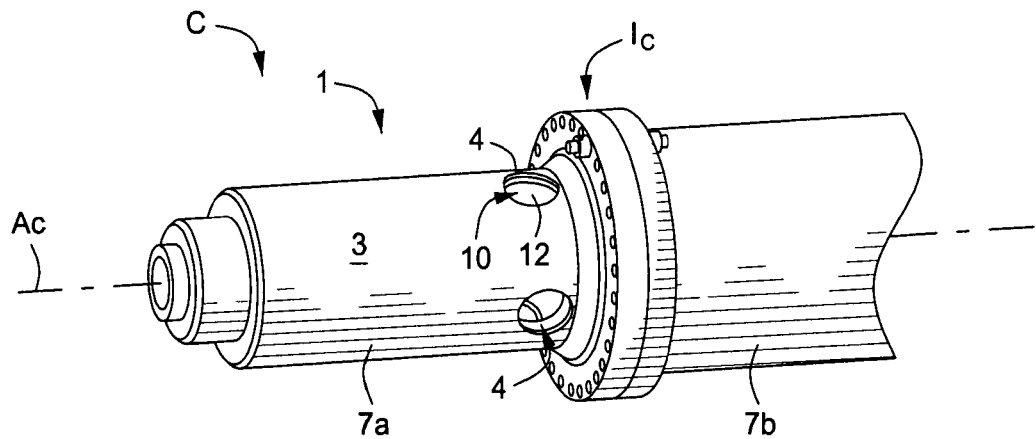
FIG. 1 is a partly broken-away, perspective view of a compressor assembly having a closure device in accordance with one or more aspects of the present disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

FIGS. 1-7 illustrate a closure device 10 for a casing assembly or casing 1 of a compressor C. In an exemplary embodiment, the compressor C may include a high-pressure turbo compressor. The casing 1 may include a central longitudinal axis $A_C$, an inner surface 2 defining an interior chamber $C_C$, an opposing outer surface 3, and at least one access opening 4 extending generally radially between the casing inner and outer surfaces 2, 3. In an exemplary embodiment, the closure device 10 includes a generally cylindrical body 12 having a plug portion 14 and a head portion 16. The plug portion 14 is disposeable at least partially within, and configured to substantially obstruct, the casing opening 4. The head portion 16 may have a shoulder portion or shoulder 18 extending generally radially outwardly with respect to the plug portion 14 and disposeable generally against the casing inner surface 2. As illustrated, the shoulder 18 may be biasable against the casing inner surface 2 by pressure within the casing 1 so as retain the plug portion 14 disposed within the access opening 4. As such, the closure device 10 enables the sealing of a compressor access opening 4 without the use of bolts, clamps or other fastening devices, thereby reducing costs and maintaining the structural integrity of the casing 1.

In an exemplary embodiment, the casing 1 may include a plurality of access openings 4 and a plurality of the closure devices 10, each closure device 10 being disposeable within each one of the plurality of access openings 4. Each closure device 10 may be separately installable in each of the openings 4; in other words, each closure device 10 may be substantially identical to any other closure device 10, and each access opening 4 may be substantially identical to any other opening 4, such that each device 10 can be installed in any of the openings 4. However, if desired, each closure device 10 and opening 4 may be formed (i.e., machined, fabricated, etc.) such that each closure device 10 is only installable in a single, designated one of the openings 4. In one embodiment, the casing 1 may have at least one enclosed inner circumferential surface 5 each defining a separate access opening 4, each inner surface 5 being substantially circular and extending between the casing inner and outer surfaces 2, 3. As such, each access opening 4 may be substantially circular and have an inside diameter $ID_A$ (FIG. 4).

Figure 4:
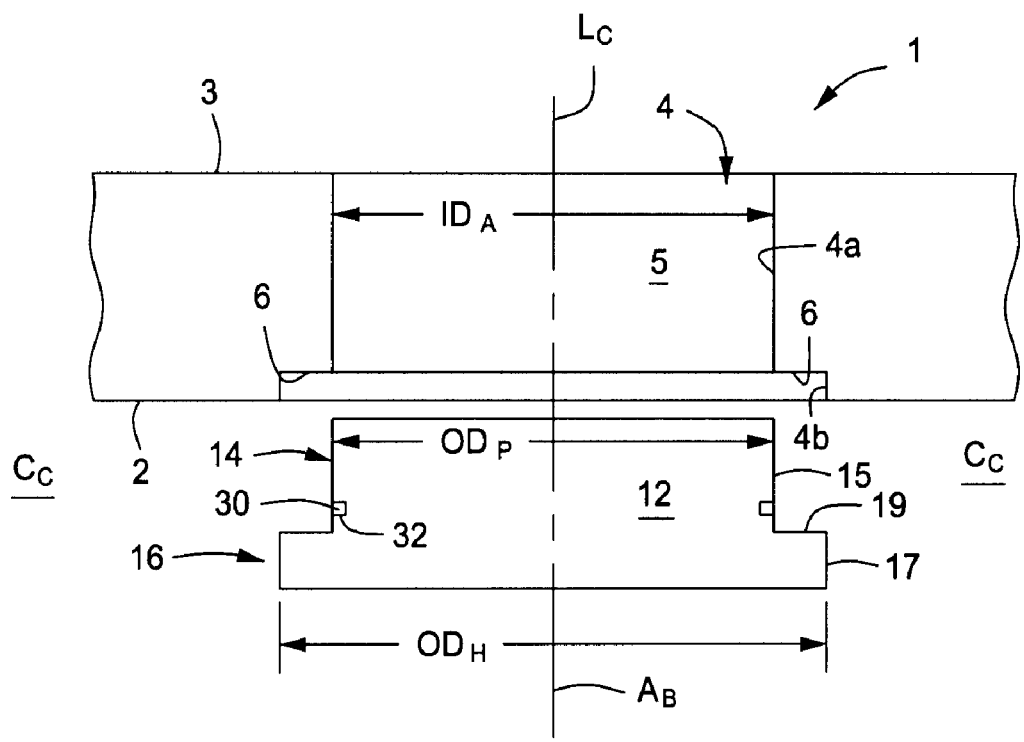
FIG. 4 is another view of the closure device of FIG. 4, shown with the closure body spaced from the access opening, according to one or more aspects of the present disclosure.
Figure 5:
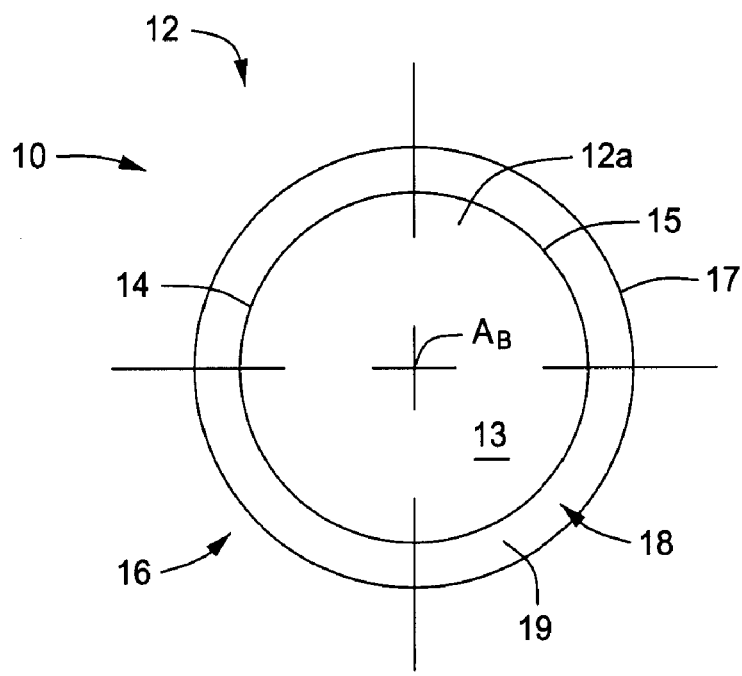
FIG. 5 is a top plan view of a closure body, according to one or more aspects of the present disclosure.
Figure 6:
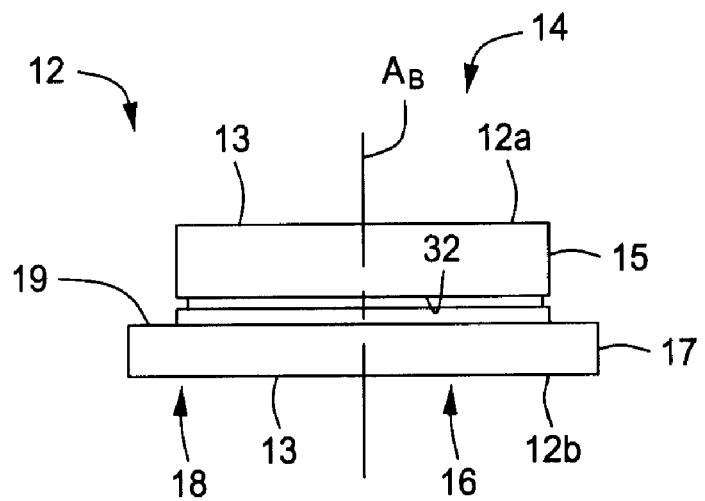
FIG. 6 is a side plan view of the closure body, shown without a sealing member, according to one or more aspects of the present disclosure.

Referring particularly to FIG. 4, each casing opening 4 has a centerline axis $L_C$ and a retention surface 6 extending circumferentially about the centerline $L_C$. Specifically, each access opening 4 may include a main bore section 4a defined by the inner circumferential surface 5 and a counterbore section 4b, as shown in FIG. 4. The opening counterbore section 4b may extend into the main bore section 4a from the casing inner surface 2, with the retention surface 6 extending generally radially between the main bore section 4a and the counterbore section 4b. Further, the main bore section 4a and the counterbore section 4b may be sized to receive the plug portion 14 and at least a portion of the head portion 16, respectively, of the closure device 10, as described in further detail below.

Figure 2:
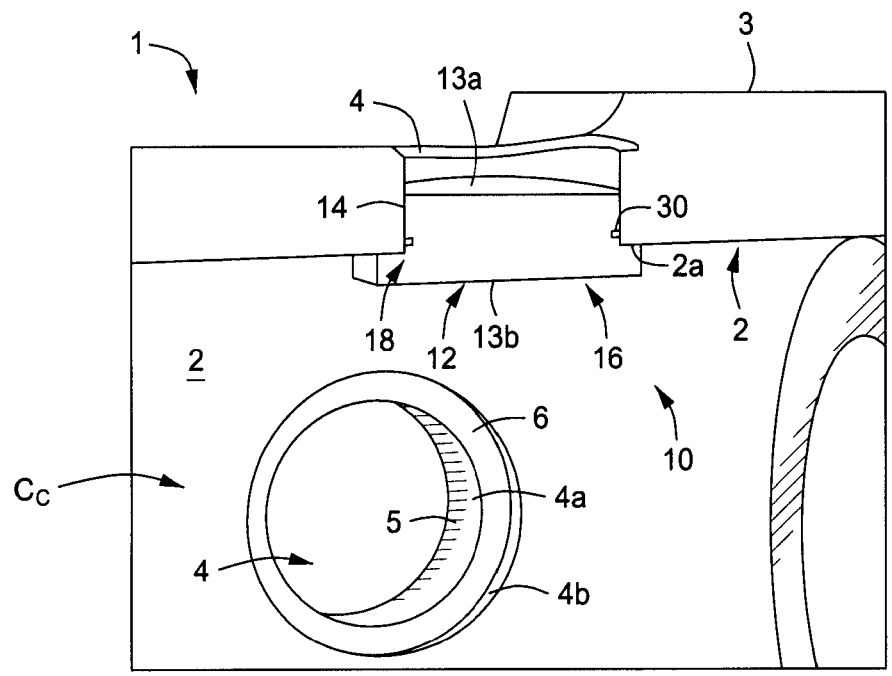
FIG. 2 is a partly broken-away, perspective view of an axial cross-section through the compressor casing and closure device, shown without internal compressor and drive components according to one or more aspects of the present disclosure.

Referring now to FIGS. 1 and 2, the plurality of access openings 4 may be spaced circumferentially about the casing axis $A_C$, and in exemplary embodiments may be substantially equally angularly spaced and generally axially aligned, but may alternatively be unevenly angularly spaced and/or axially spaced or "staggered." Furthermore, the access openings 4 may be located at least generally adjacent to an interface $I_C$ between two casing body sections 7A, 7B forming the casing 1. In an exemplary embodiment, the access openings 4 may be located at an interface between a driver casing section 7A and a casing section 7B enclosing the components of a centrifugal compressor assembly (not shown). However, as can be appreciated by those skilled in the art, the access openings 4 and closure devices 10 may be disposed at any other appropriate location on the compressor C where access is desired (i.e., for maintenance, repair, etc.).

Referring now to FIGS. 3-6, the closure body 12 has a central axis $A_B$ and first and second ends 12a, 12b spaced apart along the axis $A_B$. In an exemplary embodiment, each end 12a, 12b may have a generally radial end surface 13. In an exemplary embodiment including FIG. 3A, the shoulder 18 may extend circumferentially about the axis $A_B$, such that the plug portion 14 is offset radially inwardly from the head portion 16. In one embodiment, the plug portion 14 and the head portion 16 are each generally cylindrically-shaped, the cylindrical plug portion 14 being configured to be disposeable within each circular case opening 4. More specifically, each of the plug and head portions 14, 16 may have a generally circular outer circumferential surface 15, 17, respectively, and an outside diameter $OD_P$, $OD_H$, with the head portion outside diameter $OD_H$ being greater than the plug portion outside diameter $OD_P$. As such, the shoulder 18 may be generally circular and have a contact surface 19 extending radially between the plug outer surface 15 and the head outer surface 18, and thus from the plug outside diameter $OD_P$ to the head outside diameter $OD_H$.

Figure 3A:
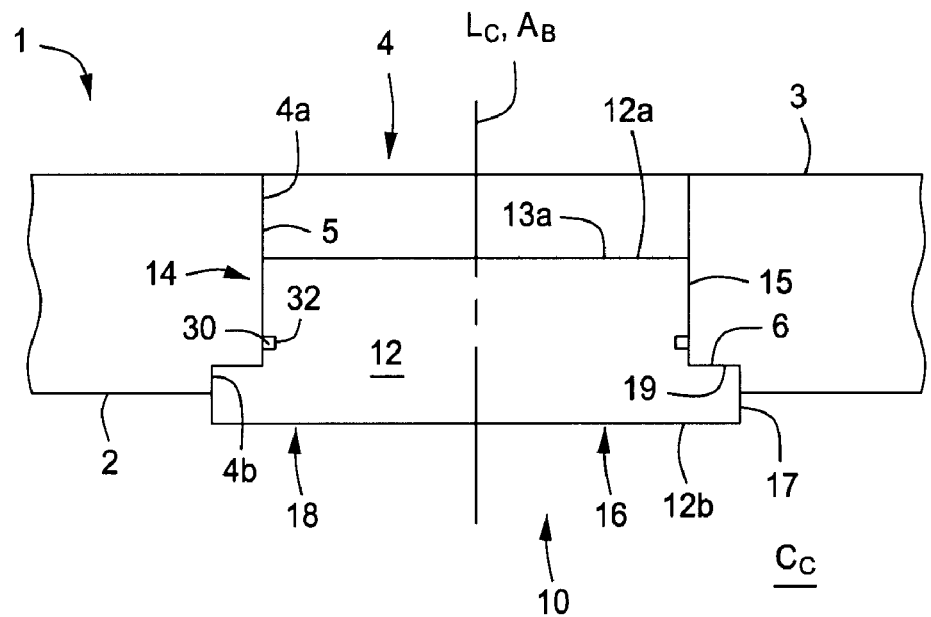
FIG. 3A is an enlarged, axial cross-sectional view of one closure device installed within a casing access opening, according to one or more aspects of the present disclosure.
Figure 3B:
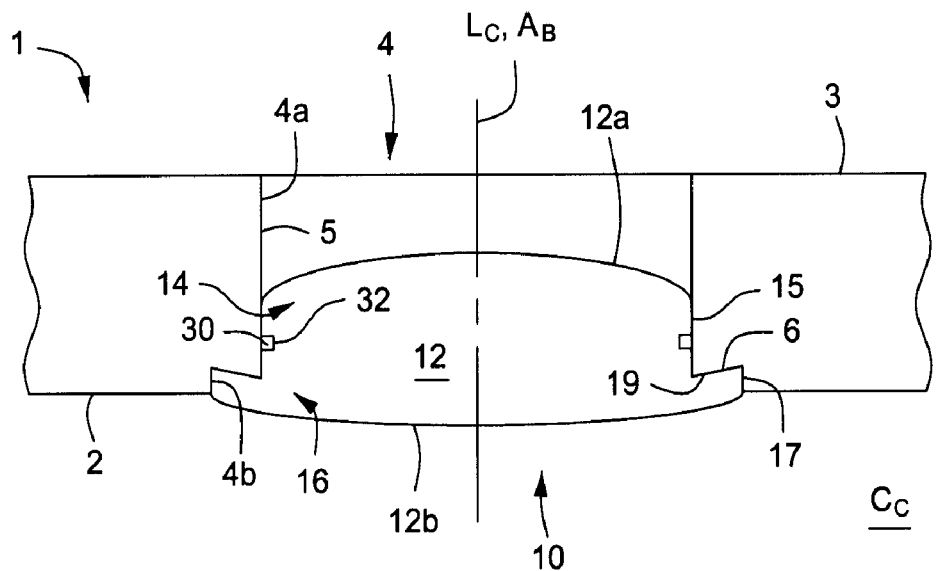
FIG. 3B is an enlarged, axial cross-sectional view of one closure device installed within a casing access opening, according to one or more aspects of the present disclosure.

In an alternative embodiment, as illustrated in FIG. 3B, the closure body 12 may be profiled to achieve minimum weights for handling. In particular, first and second ends 12a, 12b may both include a radius of curvature to decrease the overall mass of the closure body 12. Although including a tapered design, the plug portion 14 and the head portion 16 may each be cylindrically-shaped, the cylindrical plug portion 14 being configured to be disposeable within each circular case opening 4.

Further, the outer circumferential surface 15 of each plug portion 14 may be sized to be disposeable within and generally contactable with each casing opening inner surface 5. In one embodiment, this may occur in the main bore section 4a, such that the plug portion 14 may sealingly obstruct the casing access opening 4. That is, the plug portion outside diameter $OD_P$ may be sized slightly less than the opening inside diameter $ID_A$ such that the plug portion 14 may fit within the access opening 4 with minimal clearance. Further, the head portion outside diameter $OD_H$ of each closure device 10 may be sized sufficiently larger than the inside diameter $ID_A$ of each access opening 4 such that the associated shoulder 18 overlaps the opening 4 or at least the main bore section 4a thereof. Specifically, the shoulder surface 19 may extend across and be disposed against sections 2a of the casing inner surface 2 (FIG. 2) or alternatively against the retention surface 6 (FIGS. 3A and 3B), such that pressure in the casing 1 may force the respective surfaces into substantially sealing contact. In other words, the inner end surface 13 on the closure body head portion 16 may be subjected to fluid pressure P in the casing chamber $C_C$, which may generate a sealing force F directed generally radially outwardly with respect to the casing axis $A_C$, and thus may bias or "force" the casing and closure surfaces into close and/or compressive contact, as indicated in FIGS. 3A and 3B.

With access openings 4 formed of two bore sections 4a, 4b as described above, each closure body 12 may be formed such that the body shoulder surface 19 may be disposed against the retention surface 6. As illustrated in the exemplary embodiment of FIG. 3B, the shoulder surface 19 and retention surface 6 may be angled or perhaps profiled to match the radius of curvature of the head portion 16. Implementing such a profile may serve to provide a uniform bearing load when the casing 1 is fully pressurized.

In an exemplary embodiment, the plug portion 14 may occupy at least a portion of the main bore section 4a, and the head portion 16 may be partially disposed within, and extend partly outward from, the counterbore section 4b when a closure device 10 is installed within an access opening 4. More specifically, each access opening 4 and each closure device 10 may be relatively sized such that the main bore section 4a may be axially longer or larger than the plug portion 14 based on structural design limits of the closure device 10, such that the plug portion 14 only occupies a portion of the main bore section 4a and the outer end surface 13a may be spaced radially inwardly of the casing outer surface 3. Further, each head portion 16 may be axially larger than the counterbore section 4b so as to extend partially into the casing chamber $C_C$. However, each closure device body 12 may be configured such that the plug portion 14 occupies the entire main bore section 4a, or even extends radially outwardly from the casing outer surface 3. The head portion 16 may be disposed substantially entirely within the counterbore section 4b, or/and the access openings 4 may be formed without counterbore sections 4b, such that the entire head portion 16 of each closure device 10 may be disposed within the casing chamber $C_C$.

Referring to FIGS. 2-4 and 6, each closure device 10 may also include a generally annular sealing member 30 disposed about the plug portion 14. The sealing member 30 may be configured to prevent fluid flow between the plug portion 14 and the access opening 4, and thus may substantially seal any clearance space between the plug portion 14 and the access opening 4. As such, the sealing member 30 may prevent fluids within the casing interior chamber $C_C$ from passing to the exterior environment, and vice-versa. In an exemplary embodiment, the plug portion 14 of each closure device 10 may include an annular groove 32 extending inwardly from the outer circumferential surface 15, wherein the sealing member 30 may be at least partially disposed within the groove 32. The sealing member 30 may be a commercially-available elastomeric device, such as a conventional "O-ring," but may also be formed in any appropriate, alternative manner depending on the particular application.

Figure 7:
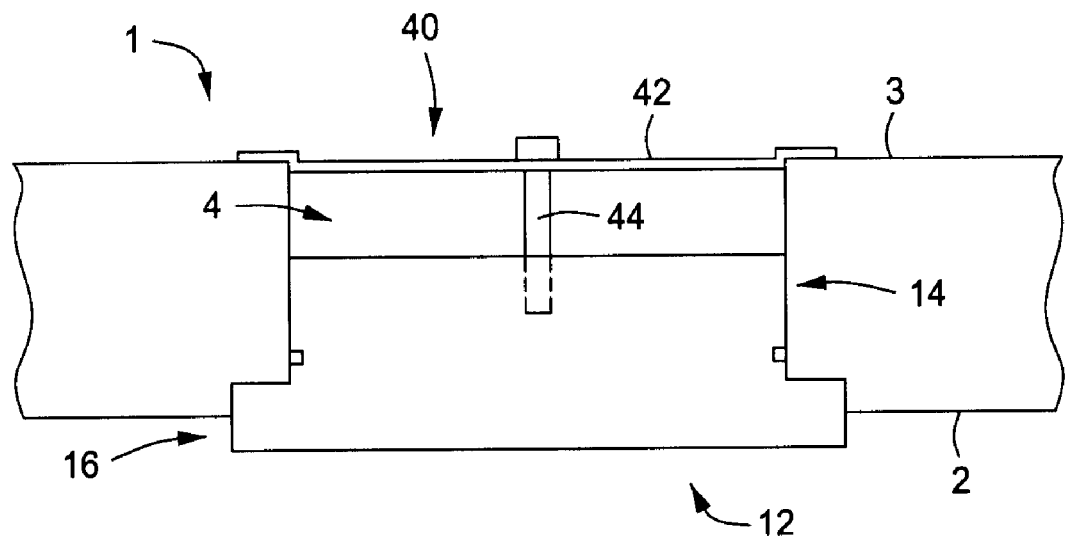
FIG. 7 is an enlarged axial cross-sectional view of one closure device installed within a casing access opening, shown with an exemplary embodiment of a retainer, according to one or more aspects of the present disclosure.

Referring particularly to FIG. 7, each closure device 10 may include at least one retainer 40 configured to retain the closure device plug portion 14 disposed within one of the casing access openings 4. An exemplary retainer 40 may function to prevent the closure device 10 from dislodging from the access opening 4, and potentially falling into the casing interior chamber $C_C$, when pressure external of the casing 1 exceeds the casing internal pressure. The retainer 40 may be formed in any appropriate manner, such as for example, being formed as one or more bolts extending through the casing 1 and engageable with the closure body 12, one or more retainer rings/ring segments, etc. As a more specific example, the retainer 40 may include a "hanger" bracket 42 engageable with the casing opening 4 and threaded rod 44 (e.g., a screw) extending between the bracket and the closure device body 12, such that the rod 44 is either advanced into body 12 to pull it toward the bracket, and thus retained in the opening 4, or withdrawn from the body 12 to permit the closure device 10 to be removed from the opening 4.

Although the closure device 10 of the present disclosure is specifically described and depicted as being used in a high-pressure casing of a centrifugal compressor assembly, the closure device 10 may be used with any other high or low pressure casing assembly, such as for example, a low pressure centrifugal compressor, a reciprocating compressor or any other type of fluid machinery.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A closure device for an access opening of a compressor casing, comprising:
   a cylindrical plug at least partially disposable within the access opening, the compressor casing having an outer surface disposed radially outward from an inner surface, the access opening extending between the inner and outer surfaces, wherein the plug is configured to substantially obstruct the access opening;
   a shoulder extending radially outward from the cylindrical plug, wherein the shoulder is at least partially disposable against the inner surface of the compressor casing, such that pressure within the compressor casing forces the shoulder into contact with the inner surface to retain the plug at least partially disposed within the access opening; and
   a sealing member disposed circumferentially about the plug and configured to substantially prevent fluid flow between the plug and the access opening, wherein the compressor casing comprises first and second casing sections, and wherein the access opening is disposed generally adjacent to an interface between the first and second casing sections.

2. The closure device of claim 1, wherein the access opening comprises a main bore section and a counterbore section.

3. The closure device of claim 2, wherein the main bore section is sized to receive the plug, and wherein the counterbore section is sized to receive at least a portion of the shoulder.

4. The closure device of claim 1, wherein at least one of an end of the plug and an end of the shoulder includes a radius of curvature.

5. The closure device of claim 1, further comprising a retainer configured to retain the plug disposed within the access opening.

* * * * *